United States Patent
Sethi et al.

(10) Patent No.: US 11,334,898 B2
(45) Date of Patent: May 17, 2022

(54) METHOD AND APPARATUS FOR MICROSERVICE ARCHITECTURE FOR LOCALLY BASED APPLICATIONS

(71) Applicant: DELL PRODUCTS, LP, Round Rock, TX (US)

(72) Inventors: Parminder Singh Sethi, Ludhian (IN); Sharmad Naik, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 16/674,210

(22) Filed: Nov. 5, 2019

(65) Prior Publication Data

US 2021/0133770 A1    May 6, 2021

(51) Int. Cl.
*G06Q 30/02* (2012.01)
*G06N 20/00* (2019.01)
*G06F 11/34* (2006.01)

(52) U.S. Cl.
CPC ..... *G06Q 30/0201* (2013.01); *G06F 11/3438* (2013.01); *G06F 11/3495* (2013.01); *G06N 20/00* (2019.01)

(58) Field of Classification Search
CPC ............ G06Q 30/0201; G06F 11/3438; G06F 11/3495; G06N 20/00
USPC ........................................................ 717/174
See application file for complete search history.

(56) References Cited

U.S. PATENT DOCUMENTS

| | | | |
|---|---|---|---|
| 2019/0057096 A1* | 2/2019 | Mitra et al. | G06N 20/00 |
| 2019/0340684 A1* | 11/2019 | Belanger et al. | G06N 20/00 |
| 2020/0151621 A1* | 5/2020 | Garcia Delgado et al. | G06N 20/00 |
| 2021/0042638 A1* | 2/2021 | Novotny | G06F 11/3438 |

* cited by examiner

*Primary Examiner* — Wei Y Zhen
*Assistant Examiner* — Mohammed N Huda
(74) *Attorney, Agent, or Firm* — Larson Newman, LLP

(57) ABSTRACT

An information handling system includes a processor configured to store a first module of a software application, the first module of the software application selected based on customer journey information pertaining to usage of the software application. The processor begins execution of the first module prior to receipt of a second module of the software application, the second module selected based on the customer journey information.

20 Claims, 5 Drawing Sheets

METHOD AND APPARATUS FOR MICROSERVICE ARCHITECTURE FOR LOCALLY BASED APPLICATIONS

FIELD OF THE DISCLOSURE

The present disclosure generally relates to information handling systems, and more particularly relates to a microservice architecture for locally based applications.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may store a first module of a software application, the first module of the software application selected based on customer journey information pertaining to usage of the software application. The system begins execution of the first module prior to receipt of a second module of the software application, the second module based on the customer journey information.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
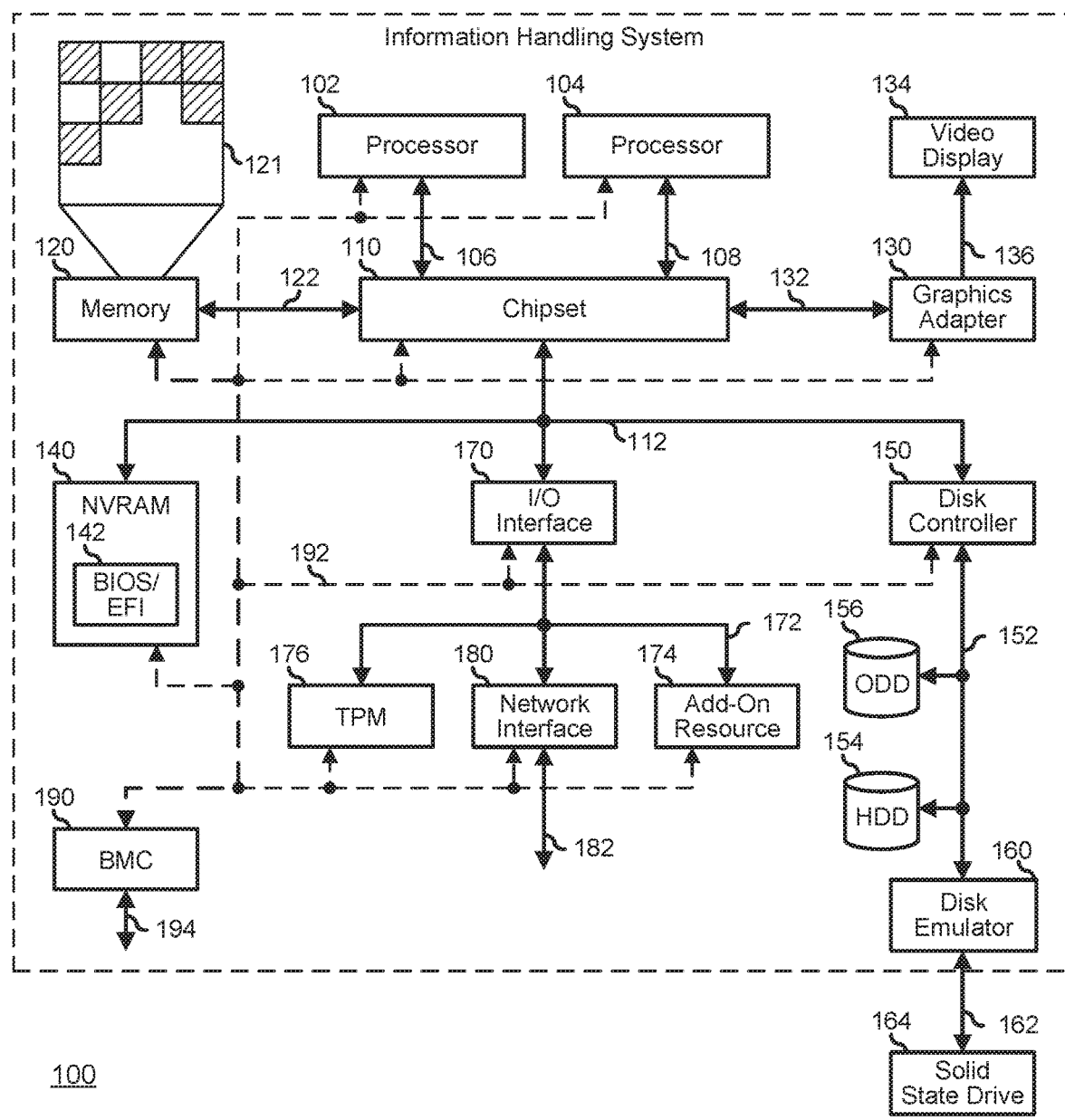
FIG. 1 is a block diagram illustrating an information handling system according to an embodiment of the present disclosure.

FIG. 1 illustrates a generalized embodiment of information handling system (IHS) 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics adapter 130, include a basic input and output system/extensible firmware interface (BIOS/EFI) module 140, a disk controller 150, a disk emulator 160, an input/ output (I/O) interface 170, a network interface 180, and a baseboard management controller (BMC) 190. Processor 102 is connected to chipset 110 via processor interface 106, and processor 104 is connected to chipset 110 via processor interface 108. Memory 120 is connected to chipset 110 via a memory bus 122. Graphics adapter 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a Serial Peripheral Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniB and channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

BMC 190 is connected by a management interface 192 to a plurality of system components, such as processor 102, processor 104, memory 120, chipset 110, graphics adapter 130, I/O interface 170, disk controller 150, NVRAM module 140, TPM 176, network interface 180, and add-on resource 174. BMC 190 is connected to an external management interface 194 for platform management by an external IHS.

Memory configuration 121 of memory 120 shows a first plurality of modules of an application loaded into memory 120, while a second plurality of modules of the application have not been loaded into memory 120. An implementation of a micro-service architecture in accordance with at least one embodiment can selectively load the first plurality of modules of the application to allow execution of the application with fewer than all of the modules of the application loaded. The selective loading of the first plurality of modules can also include the storing of the selective loading of the first plurality of modules into non-volatile storage, such as NVRAM 140, optical disk drive 156, hard disk drive 154, or solid state drive 164. As an example, the first plurality of modules of the application can be downloaded via network interface 180 and stored in memory 120 then written to a non-volatile storage device. As a further example, the first plurality of modules of the application can be read from a non-volatile storage device into memory 120 and executed by a processor, such as processor 102 or processor 104.

Figure 2:
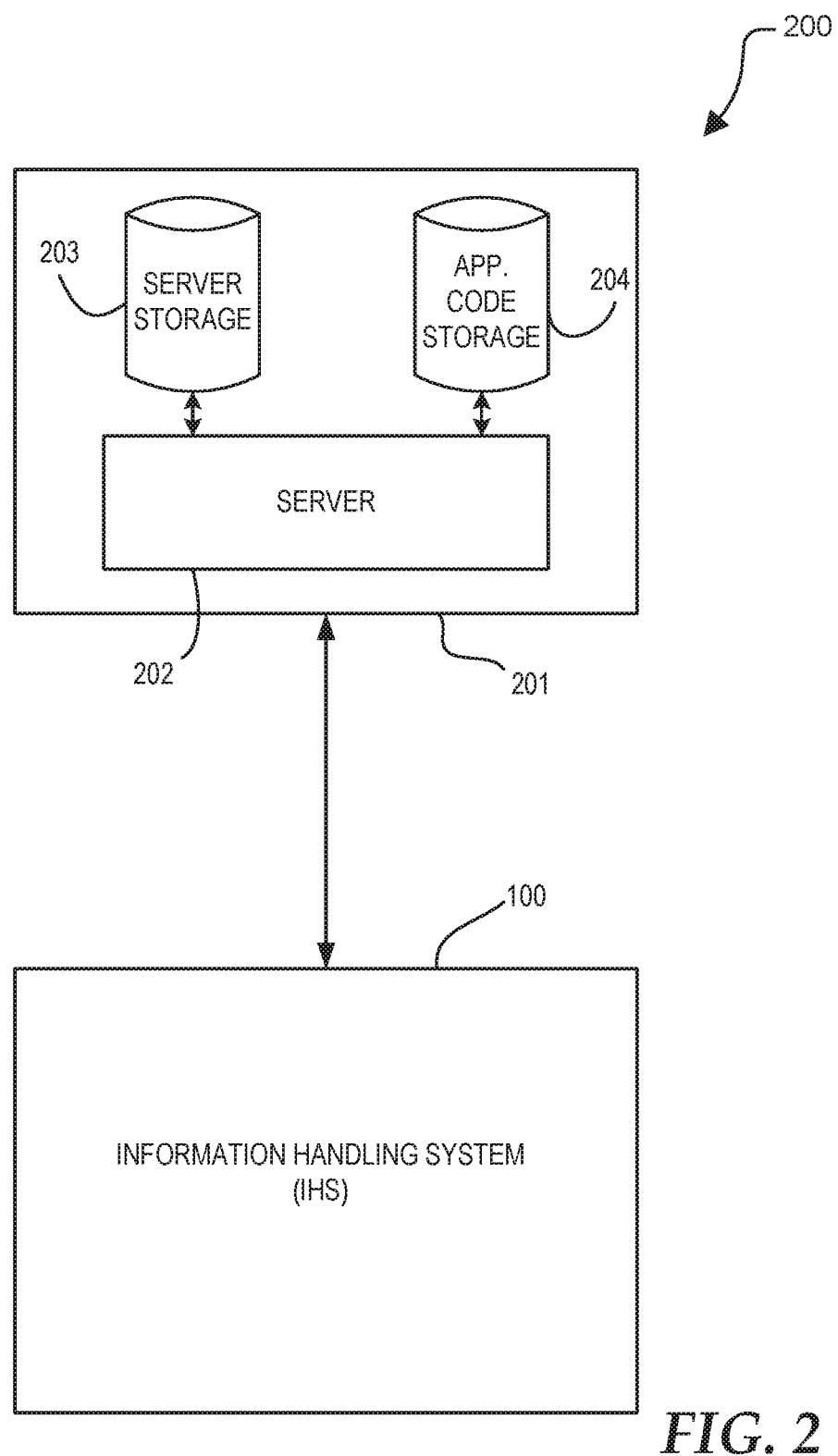
FIG. 2 is a block diagram illustrating a system for a micro-service architecture in accordance with at least one embodiment.

FIG. 2 shows a system for a micro-service architecture in accordance with at least one embodiment. System 200 comprises IHS 100 and server subsystem 201. Server subsystem 201 comprises server 202, server storage device 203, and application code storage device 204. IHS 100 is coupled to server subsystem 201, for example, via a network, such as a global information network referred to as the internet. Server 202 is connected to server storage device 203 and to application code storage device 204. Server 202 can obtain a first plurality of modules of application code stored in application code storage device 204 and provide the first plurality of modules of application code to IHS 100. Server 202 can obtain information from IHS 100, such as configuration information and usage information, to enable server 202 to select the first plurality of modules in accordance with the configuration and usage of IHS 100. As an example, server 202 can obtain localization information, such as information as to language, dialect, time zone, location, and like, or combinations thereof to include relevant language support for the application in the first plurality of modules of application code provided to IHS 100. According to such an example, modules providing language support for languages not likely to be used by IHS 100 can be included in a second plurality of modules of application code, which need not be provided to IHS 100 before IHS 100 begins execution of the application comprising the first plurality of modules of application code.

Figure 3:
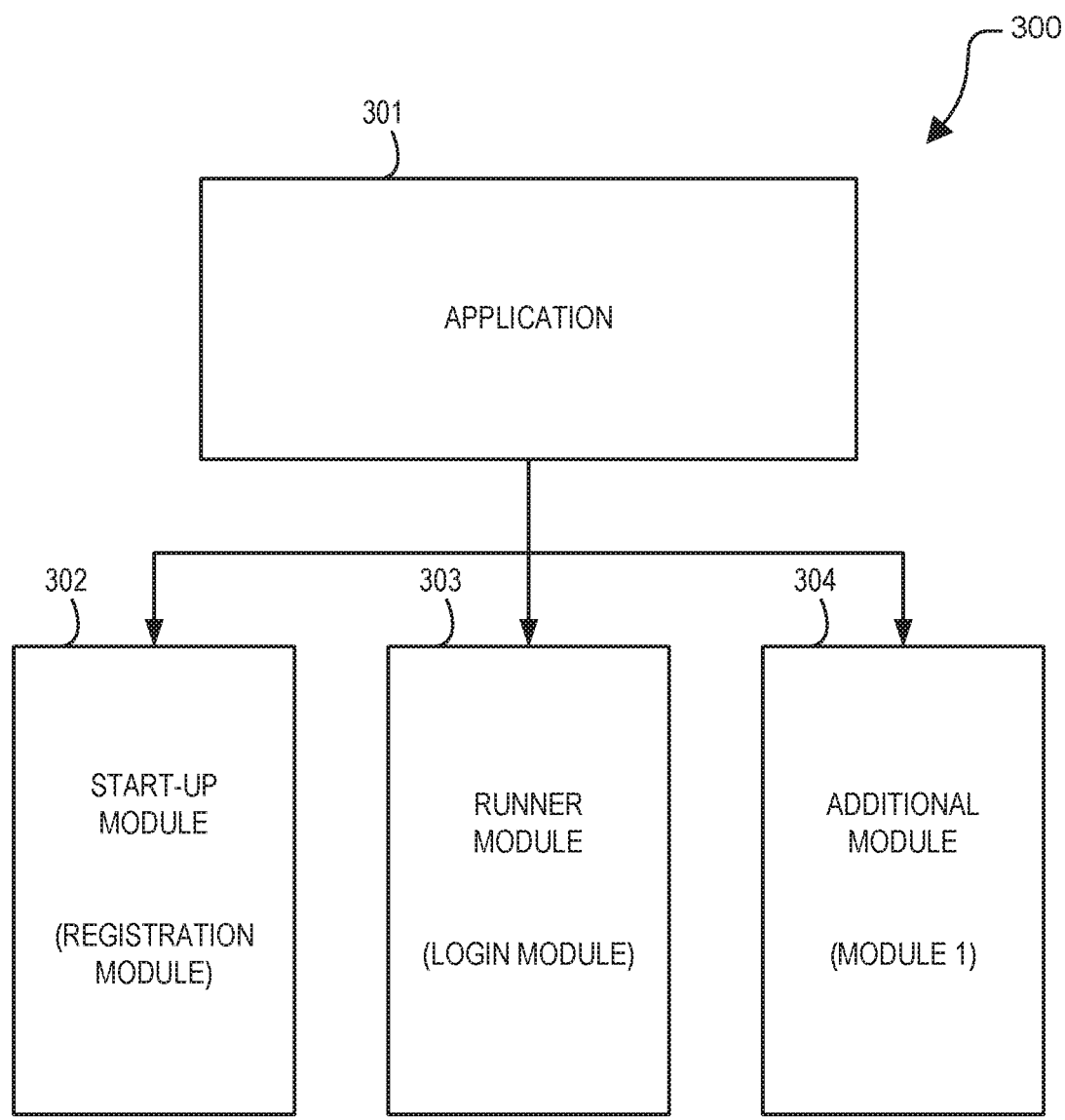
FIG. 3 is a block diagram illustrating a division of an application into modules for delivery via a micro-service architecture in accordance with at least one embodiment.

FIG. 3 shows a division of an application into modules for delivery via a micro-service architecture in accordance with at least one embodiment. Application processing 300 is performed by dividing an application 301 into a plurality of modules comprising start-up module 302, runner module 303, and additional module 304. In accordance with at least one embodiment, start-up module 302 is a registration module. In accordance with at least one embodiment, runner module 303 is a login module. In accordance with at least one embodiment, additional module 304 is designated "module 1" as a first module of a plurality of modules for loading beyond start-up module 302 and runner module 303. As an example, division of application 301 into modules can be performed according to features such as a language for a user interface (UI), processor-specific code components for particular types of processors, operating-system-specific code components for particular operating systems (OSs), levels of features (such as basic features vs. extended features), the like, and combinations thereof.

FIGS. 4-7 show dependency topologies that can be used to implement module mapping, or routing, of modules of an application. The module mapping can guide the selection of modules to be downloaded and installed to provide for continued execution of an application in accordance with a micro-service architecture.

Figure 4:
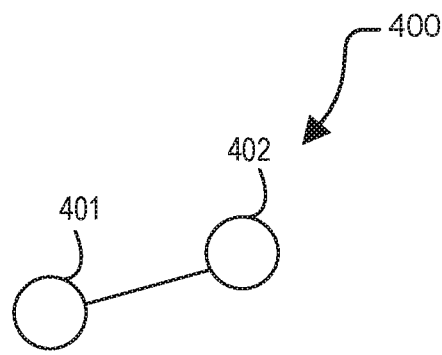
FIG. 4 is a block diagram illustrating an example of a pair dependency topology in accordance with at least one embodiment.

FIG. 4 shows an example of a pair dependency topology in accordance with at least one embodiment. Pair dependency topology 400 comprises a first node 401 connected to a second node 402. Together, first node 401 and second node 402 form a pair of nodes as a pair dependency topology.

Figure 5:
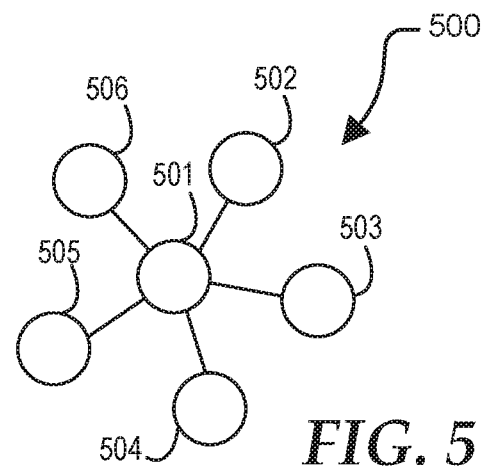
FIG. 5 is a block diagram illustrating an example of a star dependency topology in accordance with at least one embodiment.

FIG. 5 shows an example of a star dependency topology in accordance with at least one embodiment. Star dependency topology 500 comprises a first node 501 connected to each of a second node 502, a third node 503, a fourth node 504, a fifth node 505, and a sixth node 506. Together, first node 501, second node 502, third node 503, fourth node 504, fifth node 505, and sixth node 506 form a star dependency topology.

Figure 6:
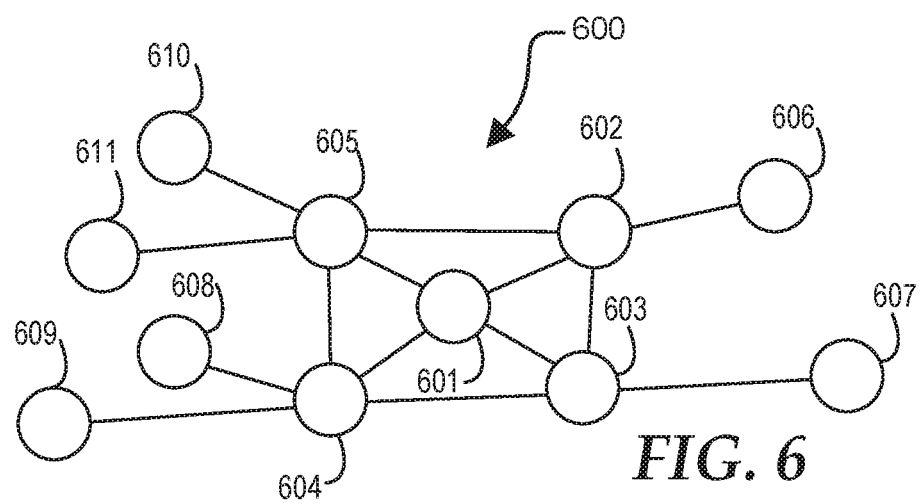
FIG. 6 is a block diagram illustrating an example of a mesh dependency topology in accordance with at least one embodiment.

FIG. 6 shows an example of a mesh dependency topology in accordance with at least one embodiment. Mesh dependency topology 600 comprises a first node 601 coupled to each of second node 602, a third node 603, a fourth node 604, and a fifth node 605. Second node 602 is coupled to each of first node 601, third node 603, fifth node 605, and sixth node, 606. Third node 603 is coupled to each of first node 601, second node 602, fourth node 604, and seventh node 607. Fourth node 604 is coupled to each of first node 601, third node 603, fifth node 605, eighth node 608, and ninth node 609. Fifth node 605 is coupled to each of first node 601, second node 602, fourth node 604, tenth node 610, and eleventh node 611. Together, first node 601, second node 602, third node 603, fourth node 604, fifth node 605, sixth node 606, seventh node 607, eighth node 608, ninth node 609, tenth node 610, and eleventh node 611 form a mesh dependency topology.

Figure 7:
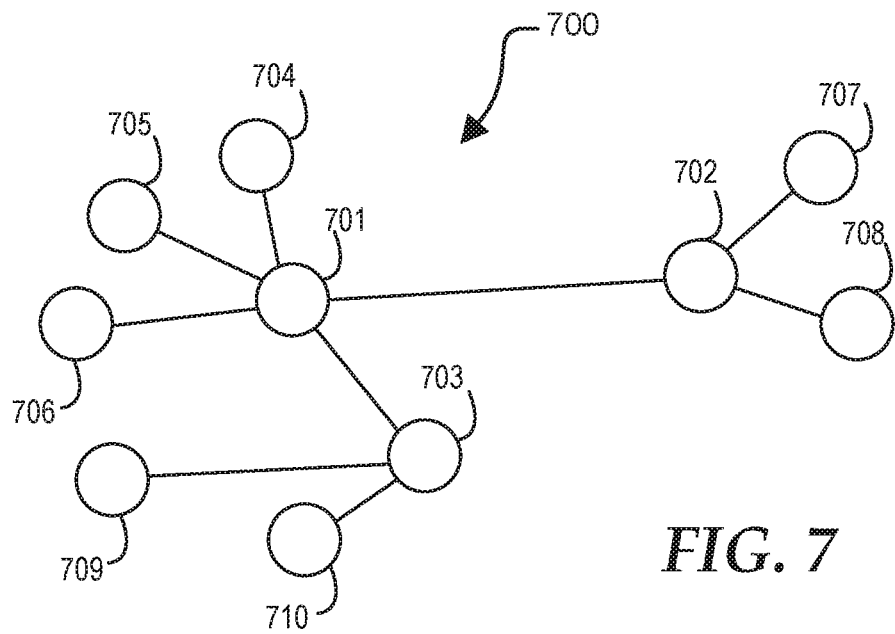
FIG. 7 is a block diagram illustrating an example of a cluster tree dependency topology in accordance with at least one embodiment.

FIG. 7 shows an example of a cluster tree dependency topology in accordance with at least one embodiment. Cluster tree dependency topology 700 comprises a first node 701 serving as a hub of a first cluster comprising first node 701, fourth node 704, fifth node 705, and sixth node 706. Cluster tree dependency topology 700 also comprises a second node 702 serving as a hub of a second cluster comprising second node 702, seventh node 707, and eighth node 708. Cluster tree dependency topology 700 also comprises a third node 703 serving as a hub of a third cluster comprising third node 703, ninth node 709, and tenth node 710. Cluster tree dependency topology 700 comprises the first cluster, the second cluster, and the third cluster. Thus, cluster tree dependency topology 700 comprises first node 701, second node 702, third node 703, fourth node 704, fifth node 705, sixth node 706, seventh node 707, eighth node 708, ninth node 709, tenth node 710, and eleventh node 711. First node 701 of the first cluster is connected to second node 702 of the second cluster and to third node 703 of the third cluster. Nodes within their respective clusters are connected to their respective hub within their respective cluster.

Figure 8:
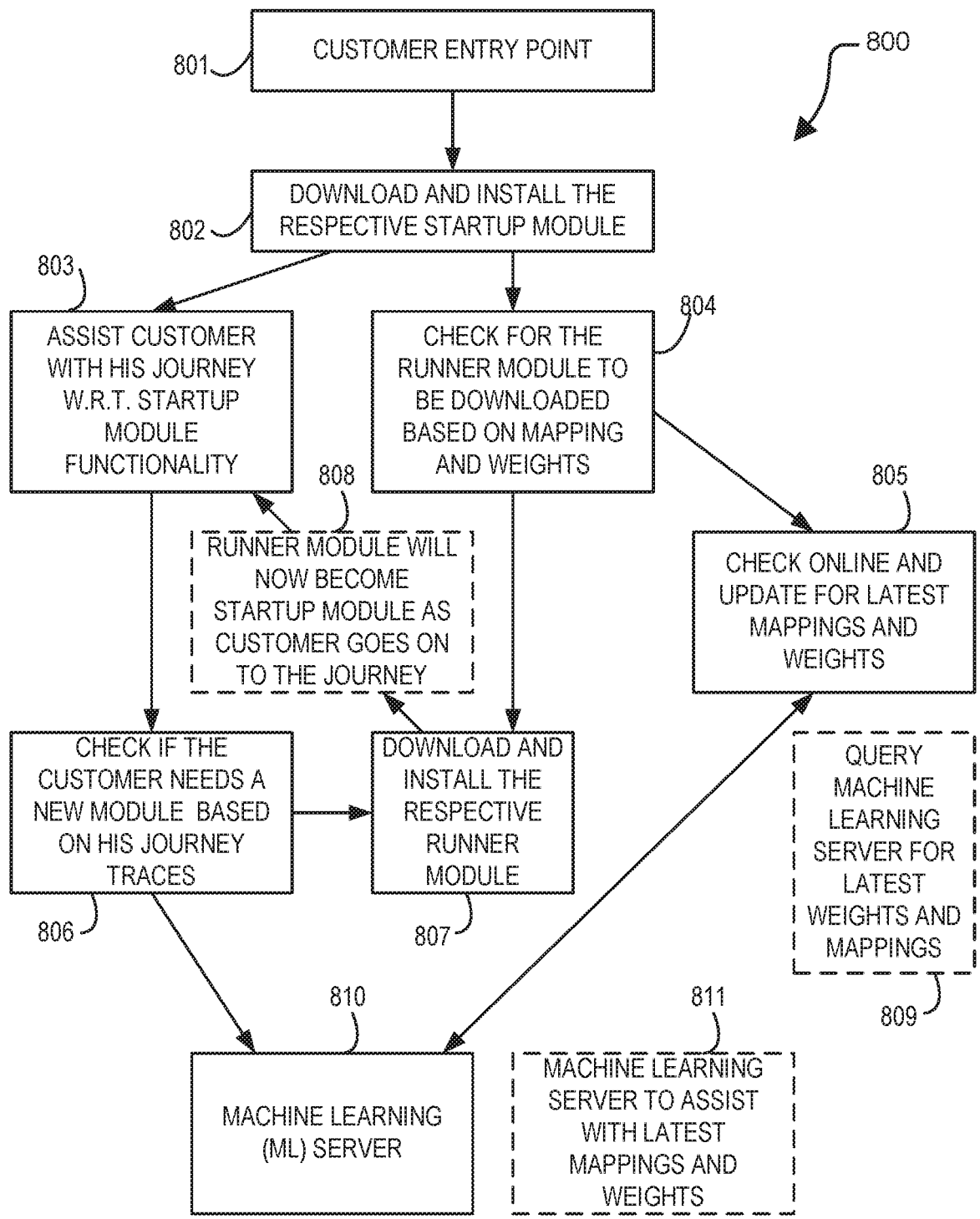
FIG. 8 is a flow diagram illustrating a method in accordance with at least one embodiment.

FIG. 8 is a flow diagram illustrating a method in accordance with at least one embodiment. Method 800 begins at block 801, which is a customer entry point. As an example, block 801 can occur when access to an application has been requested with respect to a customer's IHS. From block 801, method 800 continues to block 802. At block 802, a startup module for the application is downloaded and installed on the IHS. From block 802, method 800 continues to either of block 803 or block 804. At block 803, a customer is assisted with his journey with respect to start-up module functionality. At block 804, a check is performed for the runner module to be downloaded based on a mapping and weights. From block 804, method 800 continues to block 805 or to block 807. At block 805, a check is performed online, and an update is obtained for the latest mappings and weights. Such a check online can be performed, and such an update can be obtained, by querying a machine learning (ML) server for the latest weights and mappings and obtaining an update therefrom, as indicated by block 809. At block 807, the respective runner module is downloaded and installed. From block 807, method 800 continues via block 808 to block 803. At block 808, a runner module is made to become a start-up module as the customer goes on to the journey. From block 808, method 800 continues to block 803, where the customer is assisted with his journey with respect to start-up module functionality. From block 803, regardless of how method 800 arrived at block 803, method 800 continues to block 806. At block 806, a check is performed if the customer needs a new module based on his journey traces. From block 806, method 800 can continue to block 807 or block 810. Block 807 and the blocks that follow it have been described above. At block 810, information as to the customer's journey traces are provided to the ML server. The ML server assists by creating mappings and weights from customers' journey traces of a plurality of customers and by responding to queries for the latest weights and mappings by providing those latest weights and mappings in response to such queries, as indicated by block 811.

Performance of information handling systems can be improved by downloading and installing drivers for elements of such information handling systems. However, typically only a small percentage of customers visiting a drivers and downloads page on a support website actually download and install drivers. Moreover, a large percentage of those few customers who begin to download and install drivers typically drop during download of software in the case of driver downloads. Furthermore, a significant number of customers who visit a support page typically drop off before they even begin using system management software to access the driver update downloads. Often the application software to be downloaded and installed, for example, system management application software, can be fairly large (such as over 100 megabytes (MB)) and can require a significant amount of time (such as many minutes) to download and install. Often driver software packages are large (such as over 100 MB), although the actual driver to be installed by the driver software package may be only around 1 MB in size. As a customer may download several driver software packages during an updating session, a customer may have to download over, for example, 500 MB per session.

With updates of system management application software potentially involving millions or tens of millions or more downloads, server loads can be very high to serve the large downloads to the large numbers of users. Moreover, application software tends to grow in size over time, with a popular social media application having grown to over 250 MB in size. Such large application sizes and the need to frequently obtain updates to them, users can be inconvenienced and significant storage space on the users' devices can be demanded by the large applications and their updates. These are some factors that make it difficult to maintain updated software for end users on their devices. One aspect that has resulted in substantial user inconvenience has been an inability of users to use an application while it or its updates are being downloaded and installed. Instead, the user has had to wait until the entire application has been downloaded and installed before the user can begin to use the application. Thus, the user has been denied use of the application while it or its updates were being downloaded and installed in full.

It is typical that users will use an application for specific features but not for all the available features of which the application is capable. For example, typically only 7%-10% of the available features of an application will be used by the users of the application.

To implement a method or apparatus for a micro-service architecture for locally based applications, according to at least one embodiment, the following decision blocks can be implemented: does the user need the complete application to be downloaded at an initial time?, does the user need to have complete application at any time?, can the application try to download the other most possible and proximity-based components initially, followed by the non-essential components, as informed by the customer journey or a prediction thereof?, can the application be configured to cause download initially of essential modules so that customer experience is better and quicker while the download and installation of the rest of the application is performed in the background as time progresses?

If the user does not need the complete application to be downloaded at an initial time, the implementation of a micro-service architecture for locally based applications can proceed. If the user does need to have the complete application at a given time, loading of modules of the application can continue until the complete application is loaded. If the user does not need to have the complete application at any time, needed modules of the application can be loaded, while unneeded modules of the application can remain unloaded. If the application can be usefully executed with fewer than all of the modules of the application, the application can be downloaded by downloading the most possible and proximity-based components initially, followed by non-essential components.

The selection of the respective components can be informed by a customer's journey or a prediction of a customer's journey, as may be accomplished by processing an initial stage of a customer's journey or other initial conditions using machine learning trained using other customers' journeys. Initial loading of essential modules can improve and expedite a customer experience. Loading of non-essential modules of the application can be performed over time in accordance with available resources (such as bandwidth, memory, processor cycles, the like, and combinations thereof).

While some IHSs use primarily cloud-based applications, some IHSs use applications stored in full and executed on the IHS platform, which may, for example, be a desktop computer. The traditional paradigm for such IHSs has been to store a software application in full on the IHS platform before allowing execution of that software application on the IHS platform. The ability to deliver essential modular software application components of locally based applications to the IHS platform and to automatically supplement the initially loaded components with additional software application components subsequently downloaded over a network, by way of incrementally downloading the additional software application components until the entire software application is downloaded, of adaptively downloading the additional software application components responsive to a user's utilization or predicted utilization of the application software, or of both, is useful and brings improvement to the downloading and installation of application software.

Software applications can be divided into different modules to cover different functionalities. Different modules can sometimes work together, can sometimes work independently, and can sometime be completely dependent upon each other. For the sake of simplicity, an example having five modules can be considered, with those five modules constituting a complete software application. As one example, a user may not need all of the modules of a software application on a first day of use of the instance of the application, either as an initially installed application or as an update thereto. As another example, a subset of fewer than all of the modules of a software application may be sufficient to serve the needs of a user during the user's use of the software application, either temporarily or during the user's entire use of the software application. Accordingly, a method or apparatus for a micro-service architecture for locally based applications can enable a user to use the locally based software application without a need for all modules of the application software to be loaded initially.

In accordance with at least one embodiment, an application may be divided so as to have a fixed first module, providing a fixed starting point for the execution of the application. In accordance with at least one embodiment, the fixed first module may be a registration module. In accordance with at least one embodiment, the fixed first module may be a login module. In accordance with at least one embodiment, the fixed first module may be a dashboard module. By enabling a user to begin executing an application without yet having fully downloaded the application, the size of the installer file being provided by a server and downloaded to the user's IHS may be reduced.

In accordance with at least one embodiment, the entire application is not fully downloaded absent specific user request. In accordance with at least one embodiment, the division of the software application into modules includes division of the software application into a plurality of modules wherein at least a portion of the plurality of modules are configured to be executed on a type of device, as opposed to division of a software application into separate modules for respective different types of devices. In accordance with at least one embodiment, the loading of the modules of a software application is not merely in response to an operation that initiates first use of a feature provided by the module. In accordance with at least one embodiment, the later loading of a previously unused module of a software application is performed automatically from a server. In accordance with at least one embodiment, the later loading of a previously unused module of a software application does not require the insertion of storage media into the IHS configured to execute the software application.

In accordance with at least one embodiment, machine learning is implemented to analyze the most common user paths (such as journeys) through different modules of application, so that modules can be downloaded in a partially speculative way as informed by predictions obtained from machine learning to provide proactive availability of modules in advance of a determination that the modules will actually be needed for execution.

In accordance with at least one embodiment, based on the user IHS's entry point, the application decides on the likely paths of the user IHS and focuses on downloads of components pertaining to the likely paths without downloading modules not needed for the likely paths. In accordance with at least one embodiment, if the user is coming from the web (such as on the internet) and downloading, most likely modules to be downloaded would be a graphics user interface (GUI) modules and a registration (such as backend) module. In accordance with at least one embodiment, if the user opts for upgrade, then most likely the user would be expected to check on the newer functionalities added in the feature. In accordance with at least one embodiment, the entire application can be broken, at a high level, into the following modules: a startup module, a runner module, and an additional module. Based on the system learning of a plurality of users, the preferred modules for downloading can be decided dynamically (such as if the application is connected). For example, by comparing at least a portion of a user's journey of using an application to previous journeys of a plurality of other users in their use of the application, a predictive capability can be provided to predict the likely path of the user's journey and to configure the loading of modules of the application to enable the predicted path for the user's use of the application.

In accordance with at least one embodiment, the scope of modules of an application is defined functionally so that functionality to be provided by an application can be incrementally enabled as resources (such as bandwidth, memory, storage space, etc.) are available, either at a particular time or cumulatively over time. Functionality to be provided can vary over time and may exhibit dependencies between modules. For example, a first functionality may be needed at an initial time, when execution of the application begins. A second functionality may be needed at a second time following the initial time. A third functionality may be needed at a third time following the second time. Thus, a first module, a second module, and a third module may be loaded in sequence at or before the initial, second, and third times. As one example, the modules may be loaded exclusively, such that the second module replaces the first module, and the third module replaces the second module. As another example, the modules may be loaded in an overlapping manner, where two or more modules remain present simultaneously. As a further example, the modules may be loaded cumulatively, such that each loaded module remains as other modules are loaded. A landing module can be loaded initially, with other modules to follow. The loading of the modules can be applied to loading of modules to be executed as the application or to be executed as an installer of the application.

In accordance with at least one embodiment, a schema can be defined as follows to consider the initial priority for downloads:

```
<modules>
    <module name=welcome_page binary=welcome.dll/>
    <module name=registration_page binary=registration.dll/>
    <module name=validation_page binary=validation.dll/>
    <module name=dashboard_page binary=dashboard.dll/>
    <module name= signing_page binary=signing.dll/>
</modules>
<entry>
    <entry_point name=new_user>
        <entry module_name=welcome_page type=startup weight=5 />
        <entry module_name=registration_page type=runner
            weight=4 />
        <entry module_name=validation_page type=additional
            weight=3 />
        <entry module_name=dashboard_page type=additional
            weight=2 />
    </entry_point>
    <entry_point name=existing_user>
        <entry module_name=signing_page type=startup weight=5 />
        <entry module_name=validation_page type=runner weight=4 />
        <entry module_name=dashboard_page type=additional
            weight=3 />
    </entry_point>
</entry>
```

Such an example of a schema can include a file with a name of "type," which can indicate what type of module a module is. For example, a type of a module may be specified as, for example, a startup module, a runner module, or an additional module. There can be a plurality of modules of a particular type, such as a plurality of runner modules or a plurality of modules of another type. A weight value can be assigned to a module. The respective weight values of different modules can be used to prioritize downloading among them. As an example, weights can serve as tie breakers by differentiating between modules of the same type to prioritize the order of downloading between modules of the same type.

The example of a schema set forth above shows modules for a welcome page, a registration page, a validation page, a dashboard page, and a signing page. Different startup weights can be defined for different pages, which can be served by different modules. The sets of startup weights can be different for different conditions. As an example, one condition can be whether a user is a new user or an existing user. One set of startup weights can be provided for a new user, while another set of startup weights can be provided for an existing user. In the example illustrated by the schema set forth above, for a new user, modules serving a welcome page, a registration page, a validation page, and a dashboard page are assigned weights of 5, 4, 3, and 2, respectively. The module for the welcome page has its type specified as a startup module The module for the registration page has its type specified as a runner module. The module for the validation page has its type specified as an additional module, as does the module for the dashboard page. For an existing user, modules serving a signing page, a validation page, and a dashboard page can be assigned weights of 5, 4, and 3, respectively. The module for the signing page has its type specified as a startup module. The module for the validation page has its type specified as a runner module. The module for the dashboard page has its type specified as an additional module.

As identified in the schema, if the customer journey is mapping to *new_user*, downloading will begin with the downloading of a startup module. If there is more than one startup module, the startup module defined with the highest weight will be downloaded first (which, in that case, is the welcome page). Once the download is complete, the application will install and start the startup module. While the customer onboarding is being presented, the application will look at the runner module in the schema with the highest weight and download and install the runner module locally on the IHS. The product owner is provided with an ability to define the mapping based on a different routing definition. Once the runner module is completed, the additional module with the highest weight is picked for download and installation locally on the IHS. This process continues until the entire application is downloaded.

If the customer journey is mapping to *existing_user*, downloading will begin with the downloading of a startup module. If there is more than one startup module, the startup module defined with the highest weight will be downloaded first (which, in that case, is the signing page). Once the download is complete, the application will install and start the startup module locally on the IHS. The application functionality will extend along similar lines as the above-described flow based on download and installation of the runner and additional modules.

Dynamic module mapping, which may be referred to as routing, is performed during operation of an application to determine at least one subsequent module to download and install. The module mapping is performed in preparation for or in response to indications that a subsequent module is needed for the application to continue, preferably in a manner consonant with needs of the IHS on which the application is being executed or with needs of a user of the IHS. Module mapping can be arranged, for example, according to a pair dependency topology, a star dependency topology, a mesh dependency topology, or a cluster tree dependency topology. The particular arrangement can be tailored to an application based upon the complexity and modularity of the specific application.

In accordance with at least one embodiment, there are three types of modules of an application which can be user-defined or can be decided using machine learning. They are coordinators, routers, and end points. A module mapping can reside on the client device, such as IHS 100 of FIG. 2) and same can be used for upgrade of the same application. A module mapping can be created on a backend server, such as server subsystem 201 of FIG. 2) and can be updated using machine learning. Different users' data can be integrated, from which module mapping can be formed.

In accordance with at least one embodiment, a product owner can provide a default mapping on the basis of the technical flow of the application. A pattern of usage can be determined from collected usage data for an application. Such a pattern of usage can derive from, and thus reflect, business needs, technical needs, and a user's usability of an application. A pattern of usage can be converted into a default mapping and can be the part of the application. For example, some lab management tools, which can manage devices, can upload device info to a server backend, providing alerts, case processing, etc. Registration can be performed by a landing module, enabling customer information to be obtained. The customer information can be obtained in conjunction with a data center's basic information. Once registration is done, a user might wish to add devices which can be managed by the application, and the user also may be required to log in to use the application at a next time. As an example, these modules can be directly attached modules to the registration. Once the device is added to the application, a user might need a module to collect the device information and also an upload module to upload device info to the backend server. Once information is getting collected, a user might need a module which can do alert processing. On the basis of business logic and technical usability, default mapping can be done. Mapping might be, as examples, a star or a mesh in the default state, but it can get updated on the basis of a user's usability.

In accordance with at least one embodiment, a product owner can pre-define a mapping of modules according to business and technical needs. Over a period of time, as usage of the features occurs, this mapping can be updated, such as continually, periodically, or in response to particular events, if required. An upgrade of an application may change the mapping. As one example, a change can be happen because an application vendor has introduced new direct or indirect dependencies. As another example, a change can also occur because of end-use usage information reflecting usage to which the change can adapt operation of the application.

In accordance with at least one embodiment, an external application can track a user's journey for a specific application. An application can provide such tracking of a user's journey as an internal feature. Collection of the user moment, which is a user's journey specific to the application, can be performed.

In accordance with at least one embodiment, a default mapping can have a default weight between all the connected or dependent modules. Accordingly to data collected as the part of the customer's journey, data can impact the weights among the different components. A weight can be directly proportional to the usability and need shown by the end user. If a particular module provides a user with a higher amount of usability of the application or is shown to be needed for the user's usage or predicted usage, that module can be given a higher weight to increase its priority for loading.

Data collected in the form of a user's journey can also change the type of module mapping of an application. As an example, an application may initially have its modules mapped in the form of a star topology as its default mapping, but later the mapping may be converted to a mesh topology.

In accordance with at least one embodiment, a module mapping configures an application for the loading of the next modules a user's usage (such as operation of the application) may indicate a likelihood of need, which may be expressed with different priority levels. Accordingly, as an installer begins, the client device will be provided with at least one component which has been marked as a start-up module by the server or other infrastructure operated by the provider of the application. The application is configured to download appropriate modules whenever needed, and the need can be finalized on the basis of an updated module mapping.

In accordance with at least one embodiment, there are three different types of weights, and download of the modules will depend upon the weights. For example, when a user will be using first module, a module mapping indicates possible next components to be used, so the application will start downloading at least one component from among the possible next components. The particular sequence for downloading can be controlled according to the dependency topology and the weights of the components as applied with respect to the first module.

In accordance with at least one embodiment, a client device will download a miniaturized version of an application, and the application will continue downloading the modules of the application whenever a need or prospective need for such modules is indicated. The miniaturized version of the application is of smaller size in the number of bytes of data needed to download it, so it can be downloaded more quickly, enabling the client device to be usefully executing the application more quickly. Furthermore, as the number of bytes of data of the miniaturized version of the application is fewer, less memory space and storage space on the client device will be occupied by the application in its miniaturized form, yet sufficient data will be downloaded for the application to be able to be used beneficially.

In accordance with at least one embodiment, a micro-service architecture pattern is provided to locally based applications, as may, for example, be used in a desktop computer environment or for a non-web-based application. Machine learning is used to analyze the most common user paths through application modules in order to download those modules in a partially speculative way. A method is provided to proactively download a few modules that the user is likely to want (and to download them in what is expected to be the most efficient sequence using the proper priority of modules) based on other users' journeys when using the application. A threshold of expected need can be set to determine whether modules of an application should be downloaded. For example, modules can be selected to be downloaded that the user is predicted to have a 65% chance (threshold) of needing soon based on the modules they've already used and other users' journeys through the modules. By limiting the modules of an application to those actually needed at a particular time on a client device, the turnaround time for a user to start using an application is reduced, and the amount of storage needed to store the modules of the application is reduced from the amount of storage that would have been needed to store the entire application locally on the client device. Machine learning is utilized to understand favorable use cases and to perform the download of selected application modules for a user as the user is using the application. A micro-service architecture for downloading and installing modules of locally based applications can provide a user with a better experience than otherwise making the user wait for the entire application to be downloaded and then made functional.

In accordance with at least one embodiment, a smaller amount of downloaded information will be needed to install and begin execution of a locally based application on a client device received from a server. By making it easier to install and update applications, an increased likelihood that the latest drivers and other software have been downloaded and installed can reduce the number of support calls from customers and improve customer experiences relative to client devices that that have not been updated. The ability to spread the downloading of modules of an application over time can provide a staggered load to backend servers as a lesser amount of information will need to be downloaded and more specifically tailored downloads can be provided to customers' client devices. Also, useful information as to a customer's journey in the use of an application can be obtained by tracing the customer's journey, and a cumulative amount of customers' journey information can be used, via machine learning, to select modules of an application to be downloaded in an efficient manner.

As an example, at least one embodiment can be implemented for a desktop application. As another example, at least one embodiment can be implemented for an application configured for docking of a portable client device (such as a laptop) with a docking station. As a further example, at least one embodiment can be implemented for a mobile application.

In accordance with at least one embodiment, a method comprises obtaining customer journey information pertaining to usage of a software application; selecting a first module of the software application based on the customer journey information; providing a first module of the software application to a client device, wherein the client device is configured to begin execution of the first module prior to receipt of a second module of the software application; selecting the second module of the software application based on the customer journey information; and providing the second module of the software application to the client device, wherein the client device is configured to execute the second module. In accordance with at least one embodiment, the method further comprises performing machine learning (ML) on the customer journey information, wherein the selecting the first module of the software application is performed in response to the performing the ML. In accordance with at least one embodiment, the customer journey information is obtained from a plurality of customers' journeys of customers obtained during use of the software application by the customers. In accordance with at least one embodiment, the method further comprises dividing the software application into a plurality of modules comprising the first module, the second module, and an additional module, wherein the first module is a start-up module and the second module is a runner module. In accordance with at least one embodiment, the software application is configured to be installed under an operating system of the client device as a locally based application of the client device. In accordance with at least one embodiment, the selecting of the first module and the selecting of the second module are performed according to a module mapping having a topology selected from a group consisting of a pair topology, a star topology, a mesh topology, and a cluster tree topology. In accordance with at least one embodiment, the selecting of the first module is performed based on a first weight assigned to the first module and the selecting of the second module is performed based on a second weight assigned to the second module.

In accordance with at least one embodiment, an information handling system (IHS) comprises a processor and a memory, the processor configured to receive and to store in memory a first module of a software application, the first module of the software application selected based on the customer journey information, the customer journey information pertaining to usage of the software application, the processor configured to begin execution of the first module prior to receipt of a second module of the software application, the processor configured to receive and to store in memory a second module of a software application, the second module of the software application selected based on the customer journey information. In accordance with at least one embodiment, the first module of the software application and the second module of the software application are selected by performing machine learning (ML) on the customer journey information. In accordance with at least one embodiment, the customer journey information is obtained from a plurality of customers' journeys of customers obtained during use of the software application by the customers. In accordance with at least one embodiment, the first module is a start-up module and the second module is a runner module. In accordance with at least one embodiment, the software application is configured to be installed under an operating system of the IHS as a locally based application of the IHS. In accordance with at least one embodiment, the first module and the second module are selected according to a module mapping having a topology selected from a group consisting of a pair topology, a star topology, a mesh topology, and a cluster tree topology. In accordance with at least one embodiment, the first module is selected based on a first weight assigned to the first module and the second module is selected based on a second weight assigned to the second module.

In accordance with at least one embodiment, a method comprises receiving a first module of the software application at a client device; executing the first module at the client device prior to receipt of a second module of the software application at the client device, the first module of the software application selected based on customer journey information, the customer journey information pertaining to usage of a software application; receiving a second module of the software application at a client device; and executing the second module at the client device, the second module of the software application selected based on customer journey information. In accordance with at least one embodiment, the first module of the software application and the second module of the software application are selected by performing machine learning (ML) on the customer journey information. In accordance with at least one embodiment, the customer journey information is obtained from a plurality of customers' journeys of customers obtained during use of the software application by the customers. In accordance with at least one embodiment, the first module is a start-up module and the second module is a runner module. In accordance with at least one embodiment, the software application is configured to be installed under an operating system of the IHS as a locally based application of the IHS. In accordance with at least one embodiment, the first module and the second module are selected according to a module mapping having a topology selected from a group consisting of a pair topology, a star topology, a mesh topology, and a cluster tree topology.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:
1. A method comprising:
obtaining customer journey information pertaining to usage of a software application, wherein the customer journey information is based on journeys, wherein journeys are user paths through different modules of the software application;
selecting a first module of the software application based on the customer journey information;
providing, by a server, a first module of the software application to a client device, wherein the client device is configured to begin execution of the first module prior to receipt of a second module of the software application, the software application being implemented according to a micro-service architecture allowing execution of the software application at the client device with fewer than all modules of the software application loaded, wherein the fewer than all modules of the software application are stored in a local memory prior to being loaded;
selecting the second module of the software application based on the customer journey information; and
providing, by the server, the second module of the software application to the client device, wherein the client device is configured to execute the second module.

2. The method of claim 1 further comprising:
performing machine learning (ML) on the customer journey information, wherein the selecting the first module of the software application is performed in response to the performing the ML.

3. The method of claim 1, wherein the customer journey information is obtained from a plurality of customers' journeys of customers obtained during use of the software application by the customers.

4. The method of claim 1 further comprising:
dividing the software application into a plurality of modules comprising the first module, the second module, and an additional module, wherein the first module is a start-up module and the second module is a runner module.

5. The method of claim 1, wherein the software application is configured to be installed under an operating system of the client device as a locally based application of the client device.

6. The method of claim 1, wherein the selecting of the first module and the selecting of the second module are performed according to a module mapping having a topology selected from a group consisting of a pair topology, a star topology, a mesh topology, and a cluster tree topology.

7. The method of claim 1, wherein the selecting of the first module is performed based on a first weight assigned to the first module and the selecting of the second module is performed based on a second weight assigned to the second module.

8. An information handling system (IHS) comprising:
a memory; and
a processor configured to receive from a server and to store in the memory a first module of a software application, the first module of the software application selected based on customer journey information pertaining to usage of the software application, wherein the customer journey information is based on journeys, wherein journeys are user paths through different modules of the software application, the processor configured to begin execution of the first module prior to receipt of a second module of the software application, the processor configured to receive from the server and to store in memory the second module, the second module of the software application selected based on the customer journey information, the software application being implemented according to a micro-service architecture allowing execution of the software application at the client device with fewer than all modules of the software application loaded, wherein the fewer than all modules of the software application are stored in the memory prior to being loaded.

9. The IHS of claim 8, wherein the first module of the software application and the second module of the software application are selected by performing machine learning (ML) on the customer journey information.

10. The IHS of claim 8, wherein the customer journey information is obtained from a plurality of customers' journeys of customers obtained during use of the software application by the customers.

11. The IHS of claim 8, wherein the first module is a start-up module and the second module is a runner module.

12. The IHS of claim 8, wherein the software application is configured to be installed under an operating system of the IHS as a locally based application of the IHS.

13. The IHS of claim 8, wherein the first module and the second module are selected according to a module mapping having a topology selected from a group consisting of a pair topology, a star topology, a mesh topology, and a cluster tree topology.

14. The IHS of claim 8, wherein the first module is selected based on a first weight assigned to the first module and the second module is selected based on a second weight assigned to the second module.

15. A method comprising:
receiving, from a server, a first module of a software application at a client device;
storing the first module of the software application in a local memory of the client device;
executing the first module at the client device prior to receipt of a second module of the software application at the client device, the first module of the software application selected based on customer journey information, the customer journey information pertaining to usage of the software application, wherein the customer journey information is based on journeys, wherein journeys are user paths through different modules of the software application, the software application being implemented according to a micro-service architecture allowing execution of the software application at the client device with fewer than all modules of the software application loaded at the client device, wherein the fewer than all modules of the software application are stored in the local memory prior to being loaded;
receiving, from the server, the second module of the software application at the client device; and
executing the second module at the client device, the second module of the software application selected based on the customer journey information.

16. The method of claim 15, wherein the first module of the software application and the second module of the software application are selected by performing machine learning (ML) on the customer journey information.

17. The method of claim 15, wherein the customer journey information is obtained from a plurality of customers' journeys of customers obtained during use of the software application by the customers.

18. The method of claim 15, wherein the first module is a start-up module and the second module is a runner module.

19. The method of claim 15, wherein the software application is configured to be installed under an operating system of the IHS as a locally based application of the IHS.

20. The method of claim 15, wherein the first module and the second module are selected according to a module mapping having a topology selected from a group consisting of a pair topology, a star topology, a mesh topology, and a cluster tree topology.

* * * * *